United States Patent Office 3,790,488
Patented Feb. 5, 1974

3,790,488
CLEANING COMPOSITION
Hirokazu Iino, 4/40 Kasumi-cho, Nishinomiya, Japan
No Drawing. Filed Jan. 2, 1973, Ser. No. 320,477
Int. Cl. C11d 3/20
U.S. Cl. 252—89  13 Claims

ABSTRACT OF THE DISCLOSURE

A cleaning composition comprising an aqueous medium having dispersed therein a 7:3 to 3:7 weight ratio mixture of a polar high molecular weight substance and a rubber, the concentration of said mixture being in the range of 10 to 60% by weight, based on the weight of the composition, and said rubber being at least one species selected from the group consisting of natural rubber, polybutadiene rubber and styrene-butadiene rubber.

---

This invention relates to a cleaning composition, more particularly to a composition for cleaning a soiled surface.

Cleaning agents heretofore known are: (1) various kinds of soap, (2) various surface active agents, (3) acids, alkalis, and aqueous solutions thereof, and (4) various solvents and those to which surface active agents are added as desired. Fundamentally, cleaning agents of those referred to above require the procedure of applying the cleaning agents to the surface to be cleaned with or without water, rubbing fully the soiled part to remove dirt from the surface, and then wiping the cleaning agents and dirt off with dry cloth or washing them off with water. When these conventional cleaning agents are used, however, dirt will conversely adhere to the surface if the wiping cloth is not clean, while dirt can not be fully removed from a rough surface. Moreover, since these conventional cleaning agents are not so effective for very greasy dirt as on the worker's hands at machine shops, motor-repairing shops, etc., cleaning operation must be repeated to remove the dirt completely, which tends to cause consequent skin roughening as well as loss of time. Accordingly, they are not satisfactory from the economical and sanitary viewpoint. Furthermore, the requirement of a large quantity of water in removing greasy dirt makes it impossible to use such cleaning agents in places where there is little or no water.

It is, therefore, a main object of the present invention to eliminate the above drawbacks of the conventional cleaning agents.

Another object of the present invention is to provide a cleaning composition which is effective in removing dirt from the surface to be cleaned without using water.

A further object of the present invention is to provide a cleaning composition which can remove even obstinate greasy dirt from the surface to be cleaned.

A further object of the present invention is to provide a cleaning composition which can remove dirt not only from a smooth surface but also from a rough surface.

A further object of the present invention is to provide a cleaning composition which can remove dirt from human skin without causing skin roughening as well as loss of time.

These and other objects of the present invention will be apparent from the description to follow.

The composition of the present invention comprises an aqueous medium having dispersed therein a 7:3 to 3:7 weight ratio mixture of a polar high molecular weight substance and a rubber, the concentration of said mixture being in the range of 10 to 60% by weight, based on the weight of the composition, and said rubber being at least one species selected from the group consisting of natural rubber, polybutadiene rubber and styrene-butadiene rubber.

According to the research of the present inventor, it has been found that the above specific mixture of a polar high molecular weight substance such as polyvinyl acetate, vinyl acetate-ethylene copolymer, etc. and a rubber such as natural rubber, polybutadiene rubber, styrene-butadiene rubber, etc. has unique properties never expected from those of each component. Through further research based on this finding, the present inventor has accomplished this invention which will be described below in greater detail.

Generally, when applied in the form of aqueous emulsion to the surface of an article singly, for example, a rubber or polyvinyl acetate adheres to the surface too strongly to make it difficult to remove therefrom even by rubbing. Further when oil or grease exists on the applied surface, the rubber adheres more firmly to the surface. In technical common sense, therefore, it is by no means conceivable that the rubber and polyvinyl acetate be serviceable as principal components of a cleaning composition which has to be easily removed from the applied surface.

However, it was found that, when a rubber latex and an emulsion of polar high molecular weight substance each of which has the foregoing properties are mixed together in suitable ratio to produce the present composition and applied to the surface of an article, the mixture displays a markedly excellent adsorbing effect on the dirt existing on the surface and can easily be separated by rubbing from the applied surface with the dirt adsorbed thereto. According to the present composition dirt is adsorbed thereto very quickly and even greasy dirt can easily be removed from the applied surface. More specifically, when the present composition is applied to the surface of an article and rubbed, it adsorbs not only usual dirt such as dust but also oil, grease, dirt in the form of fine particles such as finely pulverized carbon black, substances which emit unpleasant smells of fish, garlic, etc., which could not easily be removed with conventional cleaning agents. After the adsorption of the dirt, the composition can readily be removed from the applied surface by further rubbing. The removed mixture may be in the form of waste eraser if little or no grease is present and in the form of a lump if much grease is present. Thus the dirt and the substances emitting the unpleasant smell on the surface can be removed completely to render the surface beautiful and odorless very readily and quickly.

It is not clarified as yet why the present composition comprising an aqueous dispersion of a mixture of rubber and polar high molecular weight substance respectively having properties for adhesive, displays such peculiar properties as the above.

The present composition comprising an aqueous medium having dispersed therein a polar high molecular weight substance and rubber preferably has a viscosity of 50 to 50,000 cps. determined by Brookfield viscometer and a pH value of 3.5 to 10.5. When the composition is to be applied to remove the dirt from human skin, it may have a viscosity of 2,000 to 20,000 cps. and a pH value of 4.5 to 7.0. The concentration of the mixture of a polar high molecular weight substance and a rubber in an aqueous medium is in the range of 10 to 60% by weight, preferably 35 to 50% by weight.

Polar high molecular weight substances used in the present invention include those having one or more of positively or negatively polar groups. Examples thereof are polyvinyl acetate, vinyl acetate-ethylene copolymer, acrylonitrile-butadiene copolymer, polychloroprene, acrylic resins such as polyethylmethacrylate, polybutylmethacrylate, etc. Of these polar high molecular weight substances, preferable are polyvinyl acetate and vinyl acetate-ethylene copolymer containing at least 80 wt. percent of vinyl acetate. Preferable polyvinyl acetate and vinyl acetate-ethylene copolymer used in the present invention have an average polymerization degree of 400–5,000, preferably 500–1,500. The polar high molecular weight substance dispersed in the aqueous medium preferably has an average particle size of 0.05–2µ, particularly 0.1–0.5µ. The polar high molecular weight substances can be used alone or in admixture with one another.

The rubber used in the present invention includes natural rubber, polybutadiene rubber or styrene-butadiene rubber. These rubbers can be used singly or in combination. Of these rubbers, most preferable is styrene-butadiene rubber.

According to this invention, the ratio of rubber to polar high molecular weight substance may vary depending upon the kind of high molecular weight substance, and rubber, etc. However, it should be 7:3 to 3:7 by weight, preferably 1:1 by weight. If the ratio of rubber exceeds the above value, the composition firmly adheres to the applied surface and can not be easily separated therefrom. On the other hand, if the ratio of polar high molecular weight substance exceeds the above ratio, the composition similarly tends to adhere to the surface, while reducing the ability to adsorb the dirt.

The present composition can be advantageously prepared by mixing an aqueous emulsion of polar high molecular weight substance with a rubber latex. In this case, the concentration of the emulison of polar high molecular weight substance may be 30 to 60% by weight, preferably 40 to 50% by weight. The pH of the emulsion of polar high molecular weight substance is preferably in the range of 3 to 5. The concentration of the rubber latex is in the range of 35 to 70% by weight, preferably in the range of 40 to 50% by weight. The rubber latex used in the present invention may have a pH value of 7–12, preferably 9–10.

To cleaning composition of this invention can be added various additives in order to improve the properties thereof. For example, surface active agent is added thereto in order to produce a uniform and stable dispersion of polar high molecular weight substance and rubber and to promote the separation of grease, fat and other dirt from the surface to be cleaned; Solvent is added in order to accelerate removing effect of the composition on the dirt of highly viscous oil, grease or fat such as deposited petroleum pitch; Powder of bentonite and/or cotton powder is added in order to promote the removal of greasy and fatty dirt; Silicone oil is added in order to promote the separation of the present cleaning composition from the applied surface and to improve the gloss of the cleaned surface; And water-soluble resin such as polyvinyl alcohol is added in order to adjust the viscosity of the composition.

The cleaning composition of this invention will be applied as follows: A suitable amount of a cleaning composition, depending upon the area of the surface to be cleaned and the degree of dirt and/or smell, is applied to the surface. The cleaning composition is then rubbed against the surface before it is dried and gelled so that it may repeatedly be brought into contact with the dirt or the substance emitting the smell, whereby even greasy and fatty dirt or the substance which emits obstinate smell is quickly and completely adsorbed to the cleaning composition. While being rubbed, gelation of the cleaning composition proceeds owing to the cohesion of solid particles therein as well as evaporation of the dispersion medium. As the cleaning agent is further rubbed against the surface to be cleaned, the gelled cleaning composition is changed into flakes or lump and is easily and completely removed from the surface to give a cleaned surface. The operation starting with application and ending with removal can be finished within a period as short as a few to scores of seconds.

Thus, the cleaning compositions of this invention have a very excellent effect that even concentrated greasy and fatty dirt or substance emitting obstinate smell can be removed very easily where no water is available. The present composition can be removed from the applied surface by washing it off with water instead of separating it by rubbing.

Features of this invention will be understood from the following examples.

EXAMPLE 1

One part of 50 wt. percent polyvinyl acetate emulsion (product of Showa Highpolymer Co., Ltd., Japan; trademark, "Polysole 1200") and 1 part of 50 wt. percent styrene-butadiene rubber latex (product of Japan Synthetic Rubber Co., Ltd., Japan; trademark, "JSR–561") were mixed and stirred to obtain a cleaning composition having a viscosity of 4,200 cps. and a pH value of 7.0.

Next, machine oil which cannot easily be removed with a commercial hand cleaner was intentionally applied to the back of hand, and 30 g./m.$^2$ of the cleaning composition obtained as above was then applied to the part to which machine oil was applied and rubbed against the surface, whereupon the cleaning composition gelled and was removed in the form of waste eraser. Thus machine oil was removed completely without roughening the skin and without leaving a trace of oily smell at all. The time required was approximately three seconds.

Further removal test using the cleaning composition obtained as above was carried out with pomade and lipstick in like manner, and it was found that these could likewise be removed without roughening the skin in a short time.

The cleaning composition of this invention obtained as above was applied in an amount of 35 g./m.$^2$ to the window glass of kitchen markedly soiled with various greases, oils, fats and dust, and rubbed with a nylon brush with long soft bristles, to find that the cleaning composition fell off in flaked pieces adsorbing the dirt and dirt was completely removed.

Further it was found that when the cleaning composition obtained as above was applied to plates respectively stunk of fish and garlic, and rubbed repeatedly, substances emitting these unpleasant smells could be removed completely to render the plates odorless.

EXAMPLE 2

One part of the same polyvinyl acetate emulsion and 1 part of the same styrene-butadiene rubber latex as in Example 1 and 0.1 part of xylene were mixed to obtain a cleaning composition having a viscosity of 5,600 cps.

Next, oil color which will be diluted only but cannot completely be removed with known cleaning agents of the solvent-surface active agent type was applied over the hand, and approximately 50 g./m.$^2$ of the cleaning composition obtained as above was then applied over the hand and rubbed repeatedly, with the result that the cleaning composition was removed from the hand without roughening the skin at all approximately in ten seconds, with the hand completely freed of the oil color.

A corking agent (product of Nihon Paint Co., Ltd., Japan; trademark, "Home Corking") was applied to the hand in like manner as above, which was likewise removed very quickly when so attempted.

EXAMPLE 3

One part of polyvinyl acetate emulsion (product of Showa Highpolymer Co., Ltd., Japan; trademark, "Polysole S5"), 0.4 part of latex of natural rubber prepared by the centrifugal method, 0.4 part of polybutadiene rubber latex (product of Japan Synthetic Rubber Co., Ltd., Japan; trademark, "JSR 700") and 0.7 part of water were mixed together to obtain a cleaning composition having a solid concentration of 45 wt. percent, a pH value of 8.4 and a viscosity of 14,000 cps.

This cleaning composition could also remove from various surfaces in like manner as in Example 1 dirt such as machine oil, cream, pomade, corking agent, dust, etc. in a very short time with very good results.

EXAMPLE 4

Five parts of emulsion of vinyl acetate-ethylene copolymer (product of Kuraray Co., Ltd., Japan; trademark, "Panflex OM 5010") and 7 parts of styrene-butadiene rubber latex (product of Japan Synthetic Rubber Co., Ltd., Japan; trademark, JSR 2018") were mixed to obtain a cleaning composition having a solid concentration of 46 wt. percent, a pH value of 8.4 and a viscosity of 250 cps.

The cleaning composition thus obtained showed remarkable effects for removing dirt and substances emitting smells in like manner as the composition obtained in Example 1.

EXAMPLE 5

One part of 40 wt. perecent emulsion of acrylic resin (product of Yuka-Badische Co., Ltd., Japan; trademark, "Acronal 230D") and 1 part of 50 wt. percent styrene-butadiene rubber latex (product of Japan Synthetic Rubber Co., Ltd., Japan; trademark. "JSR 0561") were mixed to obtain a cleaning composition having a concentration of 45 wt. percent. The cleaning compositon thus obtained gave good results for removing dust, greasy dirt and substance emitting smell in the same manner as in Example 1.

EXAMPLE 6

One part of 50 wt. percent emulsion of polychloroprene (product of Showa Neoprene Co., Ltd., Japan; trademark, "Neoprene 650") and 1 part of 50 wt. percent styrene-butadiene rubber latex (product of Nippon Geon Co., Ltd., Japan; trademark, "Nipol 4850") were mixed to obtain a cleaning composition. The composition thus obtained showed distinguished effects especially for removing greasy dirt for the supplied surface in the same manner as in Example 1.

What I claim is:

1. A cleaning composition comprising an aqueous medium having dispersed therein a 7:3 to 3:7 weight ratio mixture of a polar high molecular weight substance and a rubber, the concentration of said mixture being in the range of 10 to 60% by weight, based on the weight of the composition, and said rubber being at least one species selected from the group consisting of natural rubber, polybutadiene rubber and styrene-butadiene rubber and said polar high molecular weight substance is at least one of polyvinyl acetate, vinyl acetate-ethylene copolymer, acrylonitrile-butadiene copolymer, polychloroprene, polyethyl-methacrylate and polybutyl-methacrylate.

2. The cleaning composition according to claim 1, in which said polar high molecular weight substance is at least one of polyvinyl acetate and vinyl acetate-ethylene copolymer containing at least 80 wt. percent of vinyl acetate.

3. The cleaning composition according to claim 2, in which said polyvinyl acetate has an average polymerization degree of 400 to 5,000.

4. The cleaning composition according to claim 3, in which said average polymerization degree is in the range of 500 to 1,500.

5. The cleaning composition according to claim 2, in which said vinyl acetate-ethylene copolymer has a average polymerization degree of 400 to 5,000.

6. The cleaning composition according to claim 5, in which said average polymerization degree is in the range of 500 to 1,500.

7. The cleaning composition according to claim 1, in which said rubber is styrene-butadiene rubber.

8. The cleaning composition according to claim 1, in which said weight ratio of polar high molecular weight substance and the rubber is 1:1.

9. The cleaning composition according to claim 1, in which said concentration of the mixture in the aqueous medium is 35 to 50% by weight.

10. The cleaning composition according to claim 1, in which said aqueous composition has a viscosity of 50 to 50,000 cps.

11. The cleaning composition according to claim 10, in which said viscosity is 2,000 to 20,000 cps.

12. The cleaning composition according to claim 1, in which said aqueous medium has a pH value of 3.5 to 10.5.

13. The cleaning composition according to claim 12, in which said pH value is in the range of 4.5 to 7.0.

References Cited

UNITED STATES PATENTS

| 1,989,246 | 1/1935 | Reed | 260—4 |
| 2,420,295 | 5/1947 | Biehn et al. | 424—28 |
| 2,525,303 | 10/1950 | Lenokle | 252—89 UX |

FOREIGN PATENTS

| 4,773 | 1898 | Great Britain | 252—Dig. 5 |

WILLIAM L. SHULTZ, Primary Examiner

U.S. Cl. X.R.

252—Dig. 5